Oct. 13, 1942.  D. L. BRINKLEY  2,298,341
MOTOR VEHICLE PERISCOPE
Filed Nov. 14, 1940
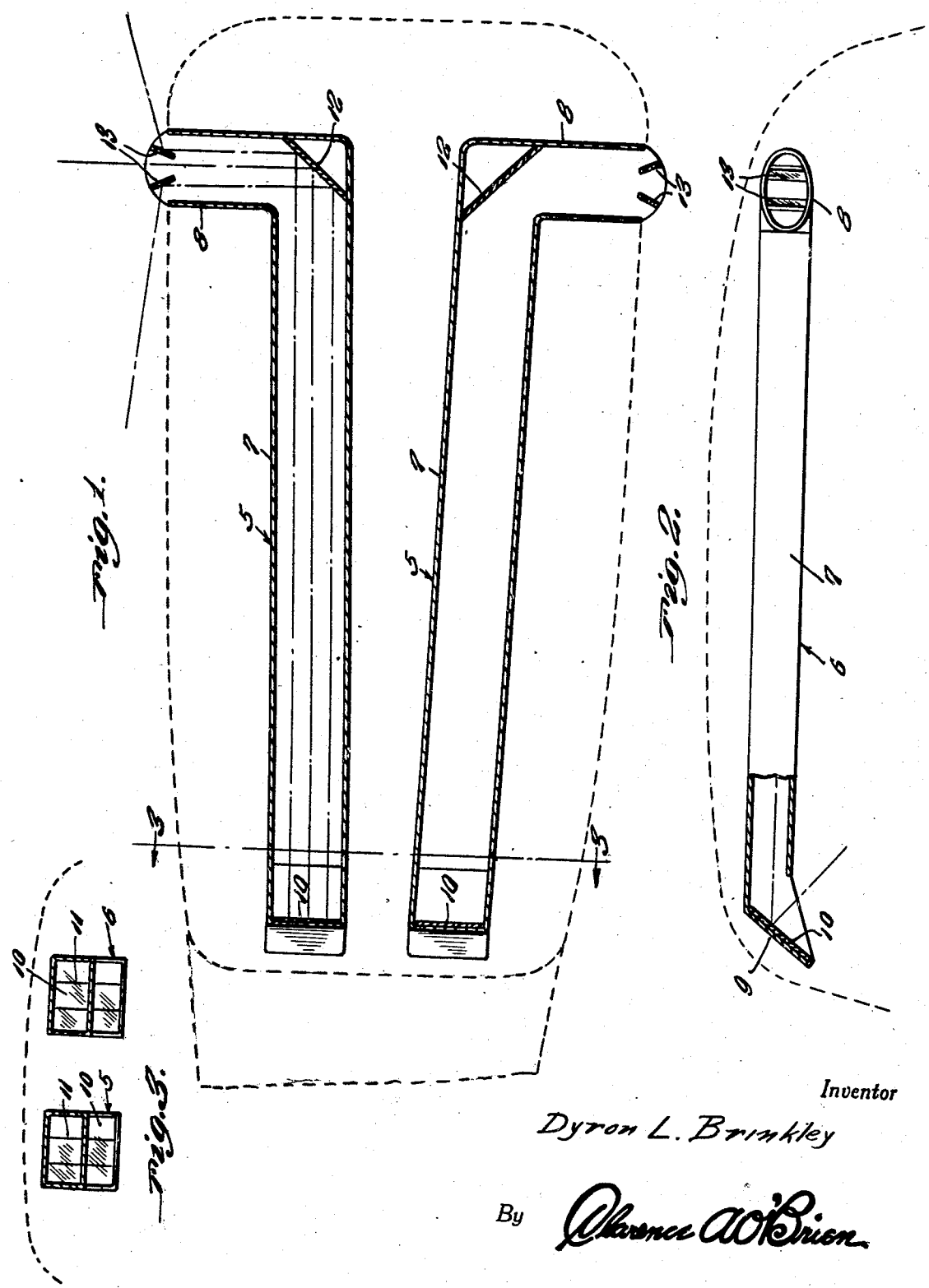
Inventor
Dyron L. Brinkley
By Clarence A. O'Brien
Attorney Patented Oct. 13, 1942

2,298,341

UNITED STATES PATENT OFFICE 2,298,341

MOTOR VEHICLE PERISCOPE

Dyron L. Brinkley, Rodessa, La.

Application November 14, 1940, Serial No. 365,700

1 Claim. (Cl. 88—70)

This invention relates to a periscope for motor vehicles, and has for the primary object the provision of a device of this character which may be readily installed in a present day automobile construction and will give a driver of the automobile a wide clear view of traffic to each side rearwardly of the front of the automobile and also rearwardly of said automobile without turning his head from a straight-ahead position, consequently the driver having this wide range of view and knowledge of traffic in the immediate vicinity of his automobile may easily avoid accidents which have been heretofore caused by the driver not being able to see traffic to the rear and side of the automobile when turning from a straight course or when backing out from a parked position at the curb or from an alley or other thoroughfare.

With these and other objects in view which will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a longitudinal sectional view illustrating a periscope adapted to a fragmentary portion of an automobile body wherein the latter is diagrammatically shown.

Figure 2 is a side elevation, partly in section, illustrating the device.

Figure 3 is a transverse sectional view taken on the line 3—3 of Figure 1.

Referring in detail to the drawing, it will be noted that the present invention includes a double periscope arrangement consisting of the conduits 5 and 6. These conduits are suitably secured in a motor vehicle body between the roof and the head lining of the body and each includes a portion 7 that extends longitudinally of the motor vehicle or automobile body and a portion 8 arranged at right angles to the portion 7 and opens outwardly through a side wall of the body adjacent the rear end of the motor vehicle or automobile.

The forward ends of the portions 7 of the conduits are located adjacent the windshield of the automobile and include sloping end walls 9 on which are mounted mirrors 10 arranged at an inclination with respect to the driver of the automobile so that the driver glancing upwardly may readily view said mirrors and each is provided with division lines 11 dividing the mirrors into blocks.

Arranged at the juncture of the portions 7 and 8 of the conduits are mirrors 12. Said mirrors 12 are arranged at such an angle that they will reflect into the mirrors 10. Mounted in the open ends of the portions 8 and projecting a limited distance beyond the sides of the automobile body are mirrors 13. It is to be noted that the mirrors 13 are arranged in pairs and in converging relation. The mirrors 13 act to reflect objects at the sides and forwardly and rearwardly thereof into the mirrors 12 and said mirrors 12 in turn reflect the images into the mirrors 10 where they can be viewed by the driver. The pairs of mirrors 13 being spaced, permits the mirrors 12 to reflect images directly to the sides of the automobile body and in turn reflect the latter-named images into the mirrors 10 for viewing by the driver. The paths of reflections of the various mirrors are indicated by the dot and dash lines in Figure 1, and it will be noted that the images reflected by the mirrors 13 will be reflected by the mirrors 12 into the mirrors 10 into separate blocks or spaces provided therein by the divisional lines 11. Also the images reflected from the sides of the automobile by the mirrors 12 into the mirrors 10 will be into blocks of the latter-named mirrors separate from the images reflected by the mirrors 13, consequently permitting the driver to easily determine, by looking into the mirrors 10, the exact location of other automobiles and pedestrian traffic to either side, rearwardly and forwardly of his position within the driver's compartment of the automobile body, consequently allowing the driver to have a wide range of vision rearwardly of him and to the sides and thus avoid accidents which have heretofore been caused by traffic at the sides of the automobile rearwardly of the driver not being within his line of vision.

Through the use of the ordinary rear vision mirror (not shown) and arranged between the mirrors 10 and conduits the driver also may have a clear view of traffic directly behind the automobile.

It will be seen that when the invention is installed in an automobile it is substantially hidden from view except for the ends of the portions 8 of the conduits carrying the mirrors 13 and the mirrors 10 from within the driver's compartment.

By referring to Figure 2, it will be seen that the bottom wall of the portion 7 of each conduit terminates short of the top and side walls so as to clearly expose the inclined mirrors 10 to the driver.

While I have shown and described the preferred embodiment of my invention, it will be understood that minor changes in construction, combination and arrangement of parts may be made without departing from the spirit and scope of the invention as claimed.

Having thus described the invention, what I claim is:

In a device of the character described, a conduit mounted in an automobile body close to the roof thereof and including a longitudinally extending portion and a rightangularly disposed portion opening outwardly through one side of the body adjacent the rear end of said body, said longitudinally extending portion opening outwardly in the body forwardly of the driver's sitting position and including an inclined front wall, mirrors mounted on said front wall and following the inclination thereof, a mirror located in the conduit at the junctures of the longitudinally extending portion and the rightangularly disposed portion, a pair of mirrors located in the end of the rightangularly disposed portion, and supported in an upright position with the outer edges of the mirrors projecting outwardly from the open ends of the conduit, said pair of mirrors being arranged in converging relation and spaced a selected distance apart for reflecting objects rearwardly and forwardly at the side of the body into the second-named mirror for reflection into the first-named mirror, said second named mirror being in the path of images reflected from the pair of converging mirrors and also in the path of images entering directly into the end of the conduit between said pair of mirrors and permitting the second-named mirror to reflect all of said objects into the first-named mirrors, said first-named mirrors having divisional lines for separating the objects reflected therein by the second and third-named mirrors.

DYRON L. BRINKLEY.